W. G. MARR.
SALT AND PEPPER SHAKER.
APPLICATION FILED FEB. 20, 1922.
1,437,345.
Patented Nov. 28, 1922.
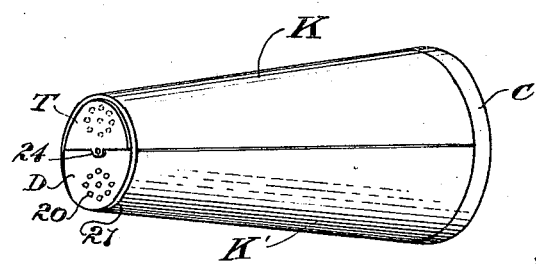
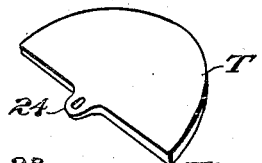
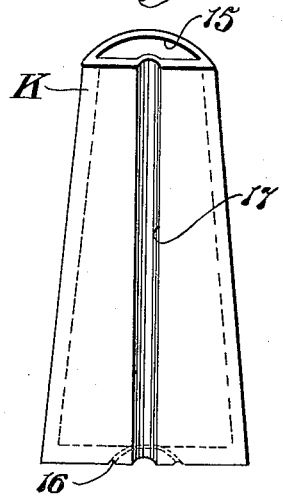
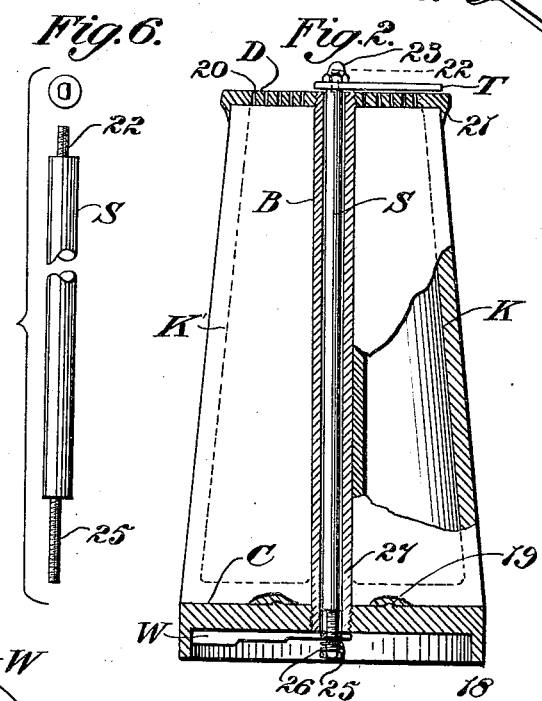
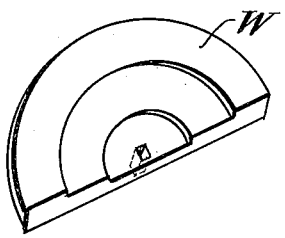
Inventor:
W. G. Marr:
by Hazard & Miller
Attys.

Patented Nov. 28, 1922.

1,437,345

UNITED STATES PATENT OFFICE.

WILLIAM G. MARR, OF LOS ANGELES, CALIFORNIA.

SALT AND PEPPER SHAKER.

Application filed February 20, 1922. Serial No. 537,830.

*To all whom it may concern:*

Be it known that I, WILLIAM G. MARR, a citizen of the United States, residing at Los Angeles, in the county of Los Angeles and State of California, have invented new and useful Improvements in Salt and Pepper Shakers, of which the following is a specification.

My invention relates to condiment holders, and a purpose of my invention is the provision of a condiment holder including two containers adapted to contain condiments of different characters and removably associated with each other to facilitate filling of the same, with a shutter controlling the discharge openings of both containers and gravity actuated to automatically close or open the discharge openings of one container or the other depending upon which container is disposed uppermost or lowermost when the holder is in discharging position.

I will describe one form of condiment holder embodying my invention and will then point out the novel features thereof in claims.

In the accompanying drawings,

Figure 1 is a view showing in perspective and in discharging position one form of condiment holder embodying my invention.

Fig. 2 is a central vertical sectional view of the condiment holder shown in Fig. 1 with portions thereof broken away.

Fig. 3 is a detail perspective view of one of the containers comprised in the holder shown in the preceding views.

Fig. 4 is a detail perspective view of the shutter comprised in the holder.

Fig. 5 is a perspective view of the weight or shutter actuating member comprised in the holder.

Fig. 6 is a view showing in side and end elevations, the shaft comprising the holder.

Fig. 7 is a view showing in side elevation the bearing sleeve comprised in the holder.

Similar reference characters refer to similar parts in each of the several views.

Referring specifically to the drawings my invention, in its present embodiment, comprises two containers K and K', each of which as clearly shown in Fig. 3, is of semi-circular form in cross section and tapered from its lower end to its upper end so that when the two are assembled as shown in Figs. 1 and 2 they have the general contour of the usual condiment holder. The upper end of each container is open as indicated at 15, while the lower end is closed and provided with a semi-circular groove 16, the purpose of which will be described hereinafter. On the inner or flat side of each container a longitudinally extending groove or channel 17 is formed, the grooves of the two containers cooperating to accommodate a sleeve bearing B which, as shown in Fig. 7, is threaded at its opposite ends for the purpose of securing a base C at its lower end and a cover D at its upper end. The base B is of disc form to accommodate the lower ends of the two containers K and K', and as shown in Fig. 2 this base is provided with an annular flange 18 which serves to space the body of the base from any support upon which it reposes. The upper side of the base is formed with an annular bead or rib 19 concentric of the axis of the disc and adapted to fit within the grooves 16 of the containers when the latter are in position thereupon as clearly shown in Fig. 2.

The cover D as shown in Fig. 2 is formed with discharge openings or perforations 20, these perforations being arranged in two groups, one group for each container and through which the contents of the containers is adapted to be discharged. At the marginal edge of the cover D a depending annular flange 21 is formed and this flange co-operates with the rib 19 in preventing displacement of the containers from between the cover and base when the latter are in applied position.

Rotatably mounted within the bearing sleeve B is a shaft S, the upper end of which is formed with a reduced extension 22 having two flat sides and two curved sides with the latter screw-threaded to accommodate a cap nut 23. The nut 23 is designed to secure a shutter T upon the extension 22, the latter being flat and of semi-circular outline as clearly shown in Fig. 4 with an ear 24 provided with an opening of the same contour as the extension so as to receive the latter. The area of the shutter T is such as to close all of the perforations of either group, and by being mounted upon the shaft S this shutter is movable to close either one group of perforations or the other.

For automatically actuating the shutter, a weight W is removably fitted upon an extension 25 formed on the lower end of the shaft S, this extension having the same cross sectional contour as the section 22 with its rounded sides screw-threaded to receive a nut 26 for confining the weight upon the extension. As clearly shown in Figs. 2 and 5, the weight is of semidisc formation and it progressively increases in thickness from its axis to its periphery so that the preponderance of weight is at the periphery for the purpose of increasing the leverage to facilitate the rotation of the shaft S.

For frictionally retaining the shaft S in a definite position and to thereby prevent accidental movement of the shutter T, a coiled expansible spring 27 is mounted upon the extension 25 between the nut 26 and the weight W, thereby exerting an upward pressure upon the weight W and a downward pressure upon the shaft S. By this arrangement it will be seen that through an upward adjustment of the nut 26 the shutter T and the weight W will frictionally engage the cover and base, respectively, with the desired amount of pressure.

In the operation of the condiment holder, salt may be placed in one container and pepper in the other, and if it is desired to discharge pepper or salt from the holder, the desired container is presented lowermost when the holder is in discharging position as shown in Fig. 1. During the movement of the holder to discharging position, the weight W will gravitate to its lowermost position thereby actuating the shaft S to move the shutter T to its uppermost position or in closing relation with respect to the perforations of the upper container. This naturally prevents the discharge of condiment from the upper container, while the openings of the lower container are open to permit of the discharge of the respective condiment therefrom.

It will be clear that by reversing the position of the holder the weight W will gravitate to move the shutter S in closing position with relation to the perforations of the other container so that the other character of condiment can be discharged from the respective container.

Although I have herein shown and described only one form of condiment holder embodying my invention, it is to be understood that various changes and modifications may be made herein without departing from the spirit of the invention and the spirit and scope of the appended claims.

What I claim is:

1. A condiment holder comprising a pair of containers, means for clamping the containers in holder formation, a shaft extending through said means, a shutter fixed to the shaft and movable to control the discharge of material from either of the containers, and a weight fixed to the shaft and operating to urge the shutter to a definite position whereby when one container is lowermost and the other container uppermost, the discharge of material from the former is permitted while the discharge of material from the latter is prevented.

2. A condiment holder comprising a pair of containers, means for clamping the containers in holder formation, a shaft extending through said means, a shutter fixed to the shaft and movable to control the discharge of material from either of the containers, a weight fixed to the shaft and operating to urge the shutter to a definite position, and a spring associated with the shaft for yieldably maintaining the shutter against movement.

3. A condiment holder comprising a pair of containers having open upper ends and grooves formed in the confronting sides thereof, a bearing sleeve mounted between the containers and in said grooves, a shaft journaled in the sleeve, a base secured to the lower end of the sleeve, a perforated cover secured to the upper end of the sleeve and spanning the open ends of said containers, a shutter fixed to the shaft and controlling the apertures of said cover, a weight secured to the lower end of the shaft and serving to gravitate the shaft to a position in which said shutter closes certain of said perforations, and means carried by the base and cover for preventing accidental displacement of the containers.

In testimony whereof I have signed my name to this specification.

WILLIAM G. MARR.